United States Patent
Kurihara et al.

(10) Patent No.: US 8,784,637 B2
(45) Date of Patent: Jul. 22, 2014

(54) METHOD FOR MANUFACTURING ANODE FOIL OF ALUMINIUM ELECTROLYTIC CAPACITOR

(75) Inventors: Naomi Kurihara, Osaka (JP);
Katsunori Matsuda, Nara (JP);
Fumiaki Kawaguchi, Kyoto (JP);
Takahiro Suzuki, Osaka (JP)

(73) Assignee: Panasonic Corporation, Osaka (JP)

(*) Notice: Subject to any disclaimer, the term of this patent is extended or adjusted under 35 U.S.C. 154(b) by 641 days.

(21) Appl. No.: 12/794,895

(22) Filed: Jun. 7, 2010

(65) Prior Publication Data
US 2010/0326837 A1 Dec. 30, 2010

(30) Foreign Application Priority Data
Jun. 18, 2009 (JP) .................................. 2009-144899

(51) Int. Cl.
| | |
|---|---|
| C25D 7/06 | (2006.01) |
| C25D 11/36 | (2006.01) |
| H01G 9/045 | (2006.01) |
| H01G 9/00 | (2006.01) |
| C25D 11/02 | (2006.01) |
| C25D 11/04 | (2006.01) |
| C23C 22/83 | (2006.01) |
| C25D 11/12 | (2006.01) |

(52) U.S. Cl.
CPC ............ *H01G 9/045* (2013.01); *H01G 9/0029* (2013.01); *C25D 11/36* (2013.01); *C25D 11/024* (2013.01); *C25D 11/04* (2013.01); *C23C 22/83* (2013.01); *C25D 11/12* (2013.01)
USPC ........... 205/153; 205/139; 205/152; 205/229; 205/318

(58) Field of Classification Search
USPC ........................................................ 205/153
See application file for complete search history.

(56) References Cited

U.S. PATENT DOCUMENTS

| | | | | |
|---|---|---|---|---|
| 4,828,659 | A * | 5/1989 | Stevens | 205/50 |
| 4,969,974 | A * | 11/1990 | Kunugihara et al. | 216/53 |
| 5,449,448 | A * | 9/1995 | Kurihara et al. | 205/153 |
| 6,096,184 | A * | 8/2000 | Yoshida et al. | 205/153 |
| 6,197,184 | B1 * | 3/2001 | Hemphill et al. | 205/333 |
| 6,299,752 | B1 * | 10/2001 | Strange et al. | 205/152 |
| 7,175,676 | B1 * | 2/2007 | Stevens et al. | 29/25.03 |
| 2001/0042687 | A1 * | 11/2001 | Yoshimura et al. | 205/83 |

FOREIGN PATENT DOCUMENTS

| | | |
|---|---|---|
| CN | 1484259 | 3/2004 |
| CN | 101110298 | 1/2008 |
| CN | 101425389 | 5/2009 |
| JP | 59-089796 | 5/1984 |

(Continued)

*Primary Examiner* — Bryan D. Ripa
(74) *Attorney, Agent, or Firm* — Wenderoth, Lind & Ponack, L.L.P.

(57) ABSTRACT

The present invention provides a method of manufacturing anode foil for aluminum electrolytic capacitors with high capacitance and decreased leakage current. The method has the following steps: dipping etched aluminum foil into pure water having a temperature of 90° C. or higher so as to form a hydrated film on the foil; attaching organic acid to the surface of the hydrated film; performing main chemical conversion on the aluminum foil with application of formation voltage after the attaching step; performing depolarization on the aluminum foil after the main chemical conversion step; and performing follow-up chemical conversion on the aluminum foil after the main chemical conversion step. The main chemical conversion treatment has two-or-more stages. In the first stage of the treatment, the foil is dipped into a phosphate aqueous solution, and in the last stage, it is dipped into an aqueous solution different from the phosphate aqueous solution.

4 Claims, 1 Drawing Sheet

(56) References Cited

FOREIGN PATENT DOCUMENTS

| | | |
|---|---|---|
| JP | 60-065517 | 4/1985 |
| JP | 2-128415 | 5/1990 |
| JP | 6-275473 | 9/1994 |
| JP | 09-275040 | 10/1997 |
| JP | 10-223483 | 8/1998 |
| JP | 2002-008949 | 1/2002 |
| JP | 2007-036043 | 2/2007 |
| JP | 2007-036048 | 2/2007 |
| JP | 2007-138236 | 6/2007 |
| JP | 2008-282994 | 11/2008 |

* cited by examiner

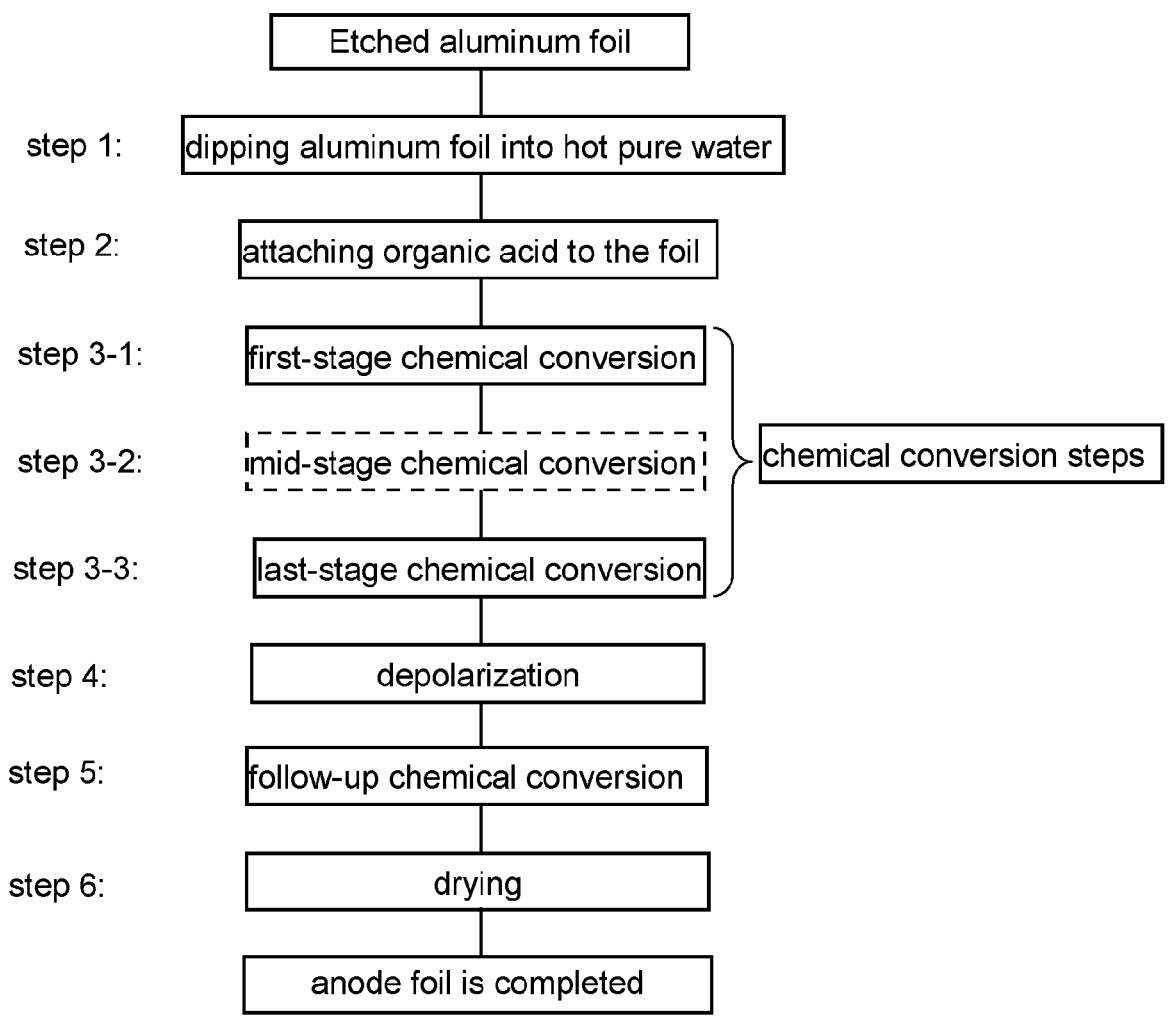

METHOD FOR MANUFACTURING ANODE FOIL OF ALUMINIUM ELECTROLYTIC CAPACITOR

TECHNICAL FIELD

The present invention relates to a method of manufacturing anode foil for aluminum electrolytic capacitors, more specifically, relates to a method of manufacturing anode foil for medium/high-pressure aluminum electrolytic capacitors with leakage current decreased.

BACKGROUND ART

Recently, as electronic equipment is formed into a compact structure with high reliability, there also has been a growing demand for manufacturing compact and highly reliable aluminum electrolytic capacitors. The trend increases the need for increase in capacitance and decrease in leakage current of anode foil used for aluminum electrolytic capacitors.

Conventionally, some suggestions have been made on the method of manufacturing anode foil used for medium/high-pressure aluminum electrolytic capacitors, such as patent literatures 1 to 4 described below.

For example, the manufacturing method disclosed in patent literature 1 has the following successive steps:
  a first step of boiling aluminum foil in pure water;
  a second step of dipping the aluminum foil into a solution of weak acid, such as phosphoric acid, acetic acid, citric acid, and succinic acid; and
  a third step of performing a chemical conversion treatment on the aluminum foil in a boric-acid solution.

To decrease leakage current of anode foil, patent literatures 2 and 3 introduce suggestions. In the method of patent literature 2, aluminum foil is boiled in pure water and then dipped into an aqueous solution of an organic acid or a salt thereof—where, the organic acid is formed of straight-chain saturated dicarboxylic acid having an odd number of carbons or trans-straight-chain unsaturated dicarboxylic acid. After that, the aluminum foil undergoes a chemical conversion treatment in an ammonium-adipate aqueous solution. In the method of patent literature 3, first, aluminum foil undergoes a main chemical conversion treatment in a boric-acid solution and then the foil is dipped in a solution of phosphoric acid, boric acid, organic acid, or a salt thereof for a predetermined period of time. After that, the aluminum foil undergoes a follow-up chemical conversion treatment with application of voltage.

Further, in the chemical conversion treatment in patent literature 4, aluminum foil undergoes the treatment with multi-stage application of formation voltage in chemical conversion solutions of citric acid, boric acid, phosphoric acid, and adipic acid. Between the multiple stages of chemical conversion, the anode foil undergoes a depolarization treatment while being dipped into an aqueous solution of citric acid and phosphoric acid.

In the manufacture of anode foil used for medium/high-pressure aluminum electrolytic capacitors, to increase capacitance, it is important that an etched pit on aluminum foil effectively works as an extended surface area to increase capacitance; at the same time, to decrease leakage current, it is important that an oxide film is formed into a structure with no defect as possible.

According to the method of patent literature 1, a hydrated film, which is obtained by the boiling step in pure water, combines with weak acid and has a stable structure, suppressing leakage current in a stable condition. However, the weak acid can damage the hydrated film, which increases defects in a film to be formed in the next process. As a result, noticeable decrease in leakage current cannot be achieved.

To address the problem above, according to the method disclosed in patent literature 2, prior to the chemical conversion treatment, aluminum foil is dipped into an aqueous solution of straight-chain saturated dicarboxylic acid or trans-straight-chain unsaturated dicarboxylic acid. This allows straight-chain saturated dicarboxylic acid to be attached to the outer layer of the hydrated film obtained by the boiling process in pure water, suppressing dissolution of the hydrated film into the solution, and accordingly, suppressing leakage current.

However, in general understanding, an electric field exerted on the chemical film accelerates crystallization of the film. It has believed that the crystallization invites contraction in volume, resulting in a defective film. Therefore, sufficient reduction in defective films is not expected, that is, high reliability is not achieved, although leakage current is suppressed smaller than the method of patent literature 1.

According to the method of patent literature 3, aluminum foil undergoes a thermal depolarization treatment after the main chemical conversion, and then the foil is dipped into a solution for the follow-up chemical conversion for a predetermined period of time. After that, the foil undergoes the follow-up chemical conversion with application of voltage. Through the processes above, a defective portion of the film is exposed and repaired by the follow-up chemical conversion treatment, which contributes to decrease in leakage current. After a hydration treatment, aluminum foil undergoes chemical conversion, until voltage reaches a predetermined level, in a boric-acid solution where aluminum is hard to dissolve. Therefore, of the etched pits on the foil, a narrow pit is inconveniently embedded in the chemical film. As a result, an effective surface area to the actually etched pits is not sufficient, which has been an obstacle to attaining high capacitance.

Besides, in the method above, a depolarization treatment or an acid treatment is employed for repairing defects in the film due to crystallization of oxide films. In the depolarization treatment with heat, a thermally oxidized film formed during the thermal process covers openings of the defective film. This hampers penetration of a chemical solution into the film in the follow-up chemical conversion. Such an insufficient chemical conversion cannot decrease leakage current and results in poor reliability. In the acid treatment, the openings of the defective film are properly kept in size; at the same time, a chemical film formed in a boric-acid solution only is relatively easy to dessolve in acid, which invites an excessive dissolution of the oxidized film. In this case, too, leakage current is not sufficiently decreased, which results in poor reliability.

According to the method of patent literature 4, aluminum foil undergoes a chemical conversion treatment formed of multi-stage processes at different formation voltages, while having a depolarization treatment between the multi-stage processes. The method brings improvements in decreasing leakage current. However, dissolution, dehydration, or transformation occurs in the hydrated film because the depolarization treatment is carried out before voltage reaches a value of final formation stage. As a result, the chemical film is formed into a low-crystalline oxide film, by which high capacitance is not expected.

Patent Literature
Patent literature 1; Japanese Unexamined Patent Application Publication No. 59-89796
Patent literature 2: Japanese Unexamined Patent Application Publication No. H06-275473

Patent literature 3: Japanese Unexamined Patent Application Publication No. H10-223483

Patent literature 4: Japanese Unexamined Patent Application Publication No. H02-128415

SUMMARY OF THE INVENTION

The present invention provides an improved method of manufacturing anode foil for aluminum electrolytic capacitors. In the method, suppressing defects in chemical films decreases leakage current, and at the same time, an effective use of the pit diameter of an etched pit formed on aluminum foil achieves high capacitance.

The method of manufacturing anode foil for aluminum electrolytic capacitors of the present invention has the following steps:

dipping etched aluminum foil into pure water having a temperature of 90° C. or higher so as to form a hydrated film on the foil;

attaching organic acid to the surface of the hydrated film;

performing a main chemical conversion treatment on the aluminum foil with application of formation voltage after the step of attaching organic acid;

performing a depolarization treatment on the foil after the step of performing the main chemical conversion treatment; and performing a follow-up chemical conversion treatment on the foil after the step of performing the main chemical conversion treatment.

The main chemical conversion treatment above has multistage processes. In the first stage of the treatment, the aluminum foil undergoes chemical conversion while being dipped into an aqueous solution of phosphate. In the last stage of the treatment, the foil undergoes chemical conversion while being dipped into an aqueous solution having a solute different from the solution of phosphate employed in the first stage.

Using the anode foil of the present invention allows an aluminum electrolytic capacitor to have increase in capacitance and decrease in leakage current, contributing to manufacture of a compact aluminum electrolytic capacitor with high reliability.

BRIEF DESCRIPTION OF THE DRAWINGS

FIG. 1 is a flow chart illustrating the steps of manufacturing anode foil in accordance with an exemplary embodiment of the present invention.

DETAILED DESCRIPTION OF THE PREFERRED EMBODIMENTS

An Exemplary Embodiment

The method of manufacturing anode foil in accordance with the exemplary embodiment of the present invention will be described with reference to FIG. 1. FIG. 1 is a flow chart illustrating the steps of manufacturing anode foil in accordance with the exemplary embodiment.

<Step 1>

Etched aluminum foil is dipped into pure water of high temperature (of at least 90° C.) so that a hydrated film is formed over the surface of the aluminum foil. In the step, a high-density hydrated film is formed over the surface of the foil. The hydrated film has a porous structure in the outer layer section.

<Step 2>

The aluminum foil with the hydrated film is dipped into an aqueous solution of an organic acid so that the organic acid is attached to the surface of the hydrated film. The high-density hydrated film is protected by the organic acid. The organic acid usable in step 2 includes straight-chain saturated dicarboxylic acid, straight-chain unsaturated dicarboxylic acid, and aromatic carboxylic acid, such as malonic acid, succinic acid, glutaric acid, maleic acid, fumaric acid, phthalic acid, and benzoic acid.

<Step 3>

The aluminum foil with an organic acid undergoes chemical conversion in a solution containing a predetermined substance. The chemical conversion treatment of the step has multiple stages. According to the embodiment, step 3 has step 3-1 through step 3-3 below.

<Step 3-1>

The aluminum foil with organic acid undergoes the first-stage chemical conversion; specifically, the foil is dipped into a phosphate solution with application of a voltage lower than a predetermined formation voltage. The voltage applied to the foil in the step is determined by a foil withstand voltage required for anode foil for aluminum electrolytic capacitors. That is, the predetermined chemical conversion voltage is an applied voltage suitable for obtaining a required withstand voltage. For example, when a foil withstand voltage of 500V is needed, a predetermined chemical conversion voltage is determined to be 500V. However, the foil withstand voltage necessarily equals to the predetermined voltage. In the first-stage chemical conversion, the hydrated film is insusceptible to dissolution by virtue of organic acid attached to the surface of the aluminum foil. Besides, employing a phosphate solution allows the foil to have an oxide film thereon, increasing diameters of etched pits. That is, a less-defective film is formed over the hydrated film and a pit diameter is increased. The process of the step contributes to increased capacitance, suppressing leakage current in a proper condition.

<Step 3-2>

Next, the foil undergoes a mid-stage chemical conversion in a predetermined solution. The voltage applied to the foil is higher than that used in the first-stage treatment (step 3-1) and is lower than that used in the last-stage treatment (step 3-3). Such controlled voltage allows the etched pits to have increased diameters, ensuring capacitance that corresponds to the etched pits. In the step, a phosphate solution should preferably be used, but not limited to; aqueous solutions of boric acid, organic acid and a salt thereof may be employed.

<Step 3-3>

Further, the foil undergoes the last-stage chemical conversion with application of formation voltage in a solution having a solute different from the phosphate solution in step 3-2. The treatment of the last stage accelerates crystallization of the oxide film under a high electric field exerted on the entire film. High capacitance is thus obtained. The solution employed in the step should preferably be an adipic-acid aqueous solution, an oxalic-acid aqueous solution and a boric-acid aqueous solution. In particular, when a boric-acid aqueous solution is used, voltage control below brings an advantageous effect. That is, controlling the formation voltage in a way that the difference between the voltage applied in the last stage and the voltage in the stage immediately preceding the last stage is greater than zero and kept within 20% of the voltage in the last stage encourages the entire film to have effective change to a crystalline anode oxide film.

When the chemical conversion of step 3 falls into four stages or more, a predetermined solution similar to that employed in step 3-2 can be used in the stages located in midstream except for the first and the last stages.

<Step 4>

After the last-stage chemical conversion, the aluminum foil undergoes a depolarization treatment so that voids created in the anode oxide film are further decreased. Specifically, the foil is dipped into a phosphoric-acid aqueous solution or an oxalic-acid aqueous solution. On the surface of the aluminum foil, the chemical conversion film has been formed in a phosphate solution. Compared to a film formed in a boric-acid solution alone, the oxide film formed through the steps above has low solubility in acid, allowing a defective opening to be extended without excessive dissolution of the film in the depolarization treatment. This contributes to improved repair of defects in a follow-up chemical conversion in step 5. As a result, such formed anode foil is excellent in decreasing leakage current.

<Step 5>

After the depolarization treatment, the aluminum foil undergoes the follow-up chemical conversion treatment. Specifically, the foil is dipped into aqueous solutions of boric acid, phosphoric acid, organic acid, or an aqueous solution of a salt thereof, with application of voltage.

Repeating the treatments of step 4 and step 5 further decreases the voids, allowing the anode foil to have further decrease in leakage current. As for the foil having undergone the depolarization treatment twice, the depolarization treatment (step 4) of the third time or afterward may be carried out with application of heat.

Hereinafter, specific examples will be described.

Example 1

Step 1

Etched aluminum foil (having an average pit diameter of 0.8 μm) is dipped into pure water with a temperature of 98° C. for ten minutes. A hydrated film is thus formed over the surface of the aluminum foil.

Step 2

The aluminum foil is dipped into an aqueous solution containing malonic acid in an amount of 5 g/l for five minutes with a temperature maintained at 85° C. The organic acid is thus attached to the hydrated film.

Step 3-1

The aluminum foil undergoes the chemical conversion treatment under the following conditions:
the solution contains monobasic ammonium phosphate in an amount of 3 g/l; processing temperature is 90° C.; applied voltage is 250V; and processing time is 15 minutes.

Step 3-2

The aluminum foil undergoes the chemical conversion treatment under the following conditions:
the solution contains monobasic ammonium phosphate in an amount of 0.5 g/l; processing temperature is 90° C.; applied voltage is 420V; and processing time is 15 minutes.

Step 3-3

The aluminum foil undergoes the chemical conversion treatment under the following conditions:
the solution contains boric acid in an amount of 50 g/l and ammonium borate in an amount of 0.5 g/l; processing temperature is 90° C.; applied voltage is 600V; and processing time is 25 minutes.

Step 4

The aluminum foil undergoes the depolarization treatment while being dipped into an aqueous solution containing phosphoric acid in an amount of 100 mg/l at 70° C. for three minutes.

Step 5

The aluminum foil undergoes the follow-up chemical conversion treatment under the following conditions:
the solution contains boric acid in an amount of 50 g/l and ammonium borate in an amount of 0.5 g/l; processing temperature is 90° C.; applied voltage is 600V; and processing time is ten minutes.

After that, the aluminum foil is dried (step 6). Anode foil is thus completed.

Example 2

Anode foil is manufactured in a similar manner to that in example 1 except for the voltage and processing time in the mid-stage chemical conversion (i.e. step 3-2): 480V for the voltage; and 15 minutes for the processing time.

Example 3

Anode foil is manufactured in a similar manner to that in example 1 except for the voltage and processing time in the mid-stage chemical conversion (i.e. step 3-2): 540V for the voltage; and 15 minutes for the processing time.

Example 4

Anode foil is manufactured in a similar manner to that in example 2 except for the solution employed in step 2; instead of an aqueous solution of malonic acid, an aqueous solution containing fumaric acid in amount of 5 g/l is employed.

Example 5

Anode foil is manufactured in a similar manner to that in example 4 except that the foil undergoes step 4 and step 5 twice.

Example 6

Anode foil is manufactured in a similar manner to that in example 2 except for the solution, the temperature, and the processing time in step 4; instead of an aqueous solution containing phosphoric acid in amount of 100 mg/l, the foil is dipped into an aqueous solution containing oxalic acid in amount of 150 mg/l at 70° C. for three minutes.

Example 7

Anode foil is manufactured in a similar manner to that in example 2 except for the process in step 4; instead of the dipping process with an aqueous solution containing phosphoric acid in amount of 100 mg/l at 70° C. for three minutes, the foil undergoes a thermal treatment at 500° C. for two minutes.

Comparative Example 1

Anode foil is manufactured in a similar manner to that in example 2 except that the foil is not dipped into in a malonic-acid aqueous solution in step 2.

Comparative Example 2

Anode foil is manufactured in a similar manner to that in comparative example 1 except for the solutions employed in step 3-1 and step 3-2; instead of the solution containing monobasic ammonium phosphate in amount of 3 g/l (in step 3-1) and the solution containing monobasic ammonium phosphate in amount of 0.5 g/l (in step 3-2), the foil undergoes chemical conversion in a solution containing boric acid in amount of 50 g/l and ammonium borate in amount of 0.5 g/l.

Comparative example 3

Anode foil is manufactured in a similar manner to that in comparative example 1 except for the process in step 4; instead of the dipping process with an aqueous solution containing phosphoric acid in amount of 100 mg/l at 70° C. for three minutes, the foil undergoes a thermal treatment at 500° C. for two minutes.

Table 1 shows the results of measurement of capacitance and leakage current on each anode foil of examples 1 through 7 and comparative examples 1 through 3. The values of leakage current in Table 1 are obtained in a manner that each anode foil is dipped into electrolyte containing boric acid in amount of 50 g/l and ammonium borate in amount of 0.5 g/l with 5-minute application of voltage of 600V.

TABLE 1

| | Ratio of difference between voltages in last stage and just before stage to voltage in last stage | Capacitance ($\mu F/10\ cm^2$) | Leakage current ($\mu A/10\ cm^2$) |
|---|---|---|---|
| Example 1 | 0.3 | 5.75 | 856 |
| Example 2 | 0.2 | 5.92 | 781 |
| Example 3 | 0.1 | 5.90 | 769 |
| Example 4 | 0.2 | 5.96 | 758 |
| Example 5 | 0.2 | 6.02 | 746 |
| Example 6 | 0.2 | 5.79 | 832 |
| Example 7 | 0.2 | 5.90 | 875 |
| Comparative example 1 | 0.2 | 5.71 | 1578 |
| Comparative example 2 | 0.2 | 5.58 | 1282 |
| Comparative example 3 | 0.2 | 5.52 | 922 |

According to each anode foil of examples 1 through 7, prior to chemical conversion, a hydrated film is formed on the surface of the foil and organic acid is attached to the film. After that, the foil undergoes the first-stage chemical conversion treatment in a phosphoric-acid aqueous solution. Table 1 apparently shows that each anode foil of examples 1 through 7 increase capacitance without increase in leakage current.

According to the results of examples 2 through 7, each foil undergoes the last-stage chemical conversion (i.e. step 3-3) in a boric-acid aqueous solution instead of a phosphate aqueous solution. This contributes to further increase in capacitance. In addition, the formation voltage applied in chemical conversion is controlled in a way that the difference between the voltage applied in the last stage and the voltage in the stage immediately preceding to the last stage is greater than zero and kept within 20% of the voltage in the last stage. This achieves further increase in capacitance.

In the depolarization treatment (i.e. step 4) after the last-stage chemical conversion, employing a phosphoric-acid aqueous solution for the treatment further suppresses leakage current.

In example 5, the foil repeatedly undergoes the depolarization treatment (step 4) and the follow-up chemical conversion treatment (step 5). Repeating step 4 and step 5 two times or more increases the chance of repairing defects in the film, contributing to further decrease in leakage current.

Next, focused on the average pit diameter of etched aluminum foil, examples will be examined whether or not the pit diameter affects the characteristics of the foil.

Example 8

Anode foil is manufactured in a similar manner to that in example 4 except for using etched aluminum foil with average pit diameters of 0.6 μm, 0.8 μm, and 1.0 μm in step 1.

Comparative example 4

Anode foil is manufactured in a similar manner to that in comparative example 3 except for using etched aluminum foil with average pit diameters of 0.6 μm, 0.8 μm, and 1.0 μm in step 1.

Table 2 shows the results of measurement of capacitance and leakage current on each anode foil of example 8 and comparative example 4.

TABLE 2

| | Average pit diameter (μm) | Capacitance ($\mu F/10\ cm^2$) | Improvement rate to comparative example 4 (%) | Leakage current ($\mu A/10\ cm^2$) |
|---|---|---|---|---|
| Example 8 | 0.6 | 5.75 | 16.0 | 776 |
| | 0.8 | 5.96 | 8.0 | 758 |
| | 1.0 | 6.02 | 3.8 | 713 |
| Comparative example 4 | 0.6 | 4.97 | — | 925 |
| | 0.8 | 5.52 | — | 922 |
| | 1.0 | 5.80 | — | 881 |

As is apparent from Table 2, the anode foil of example 8 is superior to that of comparative example 4 in both of capacitance and leakage current. This shows that the chemical conversion treatment of the embodiment provides anode foil with desirable characteristics with no regard to pit diameters of the etched foil. Besides, the smaller the pit diameter, the higher the improvement rate in capacitance. In contrast, the anode foil of comparative example 4 fails in offering sufficient capacitance due to embedded pits.

Next, to find an effect of change in voltage, an experiment is carried out on the following examples in a manner that the voltage applied in the last-stage treatment (step 3-3) is changed from the voltage applied in the mid-stage treatment (step 3-2).

Example 9

Anode foil is manufactured in a similar manner to that in example 4 except that the voltages applied in the mid-stage treatment (step 3-2) and in the last-stage treatment (step 3-3) are differently set to each value shown in Table 3.

Comparative Example 5

Anode foil is manufactured in a similar manner to that in comparative example 3 except that the voltages applied in the mid-stage treatment (step 3-2) and in the last-stage treatment (step 3-3) are differently set to each value shown in Table 3.

Table 3 shows the results of measurement of capacitance and leakage current on each anode foil of example 9 and comparative example 5.

TABLE 3

| | Voltage in step 3-2 (V) | Voltage in step 3-3 (V) | Capacitance ($\mu$F/10 cm$^2$) | Leakage current ($\mu$A/10 cm$^2$) |
|---|---|---|---|---|
| Example 9 | 320 | 400 | 9.90 | 706 |
| | 400 | 500 | 7.57 | 721 |
| | 480 | 600 | 5.96 | 758 |
| Comparative example 5 | 320 | 400 | 9.52 | 854 |
| | 400 | 500 | 7.15 | 879 |
| | 480 | 600 | 5.52 | 922 |

As is apparent from Table 3, the anode foil of example 9 is superior to that of comparative example 5 in both of capacitance and leakage current. This shows that the chemical conversion treatment of the embodiment provides anode foil with desirable characteristics with no regard to voltage applied in the last-stage chemical conversion treatment.

According to the embodiment, as described above, the method of manufacturing anode foil for aluminum electrolytic capacitors has the following steps:

dipping etched aluminum foil into pure water having a temperature of 90° C. or higher so as to form a hydrated film on the foil;

attaching organic acid to the surface of the hydrated film;

performing a main chemical conversion treatment on the aluminum foil with application of formation voltage after the step of attaching organic acid;

performing a depolarization treatment on the foil after the step of performing the main chemical conversion treatment; and performing a follow-up chemical conversion treatment on the foil after the step of performing the main chemical conversion treatment.

The main chemical conversion treatment above has multi-stage processes. In the first stage of the treatment, the aluminum foil undergoes chemical conversion while being dipped into an aqueous solution of phosphate. In the last stage of the treatment, the foil undergoes chemical conversion while being dipped into an aqueous solution having a solute different from the solution of phosphate employed in the first stage. The anode foil manufactured through the steps above has less defect in the film and decreases leakage current; at the same time, the foil achieves high capacitance with effective use of etched pits on the foil.

In particular, when a boric-acid aqueous solution is used for the last-stage chemical conversion treatment, voltage control below brings advantageous effects. That is, controlling the formation voltage in a way that the difference between the voltage applied in the last stage and the voltage in the stage immediately preceding the last stage is kept within 20% of the voltage in the last stage allows the entire film to have high electric field. This encourages crystallization of the anode oxide film, increasing capacitance.

Further, when aluminum foil is dipped into a phosphoric-acid aqueous solution or an oxalic-acid aqueous solution in the step of depolarization, a defective opening is extended without excessive dissolution of the oxide film. This contributes to improved repair of defects in the step of follow-up chemical conversion. As a result, such formed anode foil is excellent in decreasing leakage current.

INDUSTRIAL APPLICABILITY

The anode foil obtained by the method of the present invention offers high capacitance and small leakage current. Such structured anode foil allows an aluminum electrolytic capacitor to be formed into a compact structure with high reliability.

[FIG. 1]

Etched aluminum foil
step 1: dipping aluminum foil into hot pure water
step 2: attaching organic acid to the foil
chemical conversion steps
step 3-1: first-stage chemical conversion
step 3-2: mid-stage chemical conversion
step 3-3: last-stage chemical conversion
step 4: depolarization
step 5: follow-up chemical conversion
step 6: drying
anode foil is completed

The invention claimed is:

1. A method of manufacturing anode foil for aluminum electrolytic capacitors, said method comprising:

dipping etched aluminum foil into pure water having a temperature of 90° C. or higher so as to form a hydrated film on the foil;

attaching organic acid to a surface of the hydrated film;

performing a main chemical conversion treatment on the aluminum foil with application of a formation voltage after said attaching of organic acid;

performing a depolarization treatment on the aluminum foil after said performing of the main chemical conversion treatment; and performing a follow-up chemical conversion treatment on the aluminum foil after said performing of the depolarization treatment;

wherein the main chemical conversion treatment includes a plurality of first stages and a second stage after the plurality of first stages, wherein in each stage of the plurality of first stages, the aluminum foil undergoes chemical conversion while being dipped into an aqueous solution of phosphate, and in the second stage, the aluminum foil undergoes chemical conversion while being dipped into an aqueous solution having a solute different from the solution of phosphate, wherein a formation voltage in a last stage of the plurality of first stages is 80% or greater of a formation voltage in the second stage.

2. The method of manufacturing anode foil for aluminum electrolytic capacitors of claim 1, wherein the aqueous solution in the second stage of the main chemical conversion treatment is an aqueous solution of boric acid.

3. The method of manufacturing anode foil for aluminum electrolytic capacitors of claim 1, wherein the aluminum foil undergoes the depolarization treatment while being dipped into an aqueous solution of phosphoric acid or an aqueous solution of oxalic acid.

4. The method of manufacturing anode foil for aluminum electrolytic capacitors of claim 2, wherein the second stage of the main chemical conversion treatment is the last stage of the main chemical conversion treatment.

* * * * *